Nov. 15, 1932. J. C. PEARSON 1,888,142

HEADLIGHT GLARE SHIELD

Filed May 19, 1930

Joseph C. Pearson INVENTOR

BY Victor J. Evans

ATTORNEY

Patented Nov. 15, 1932

1,888,142

UNITED STATES PATENT OFFICE

JOSEPH C. PEARSON, OF MEDIA, PENNSYLVANIA

HEADLIGHT GLARE SHIELD

Application filed May 19, 1930. Serial No. 453,770.

The present invention relates to an improved head light glare shield for automobiles, it being the purpose of the invention to provide an article of this kind, which may be applied to the top of the automobile just above or adjacent the upper part of the windshield, and in such a position as to enable it to move down, when operated to a position in the path of the vision of the driver and the roadway, and then move upward out of the path of vision.

Practically all drivers of automobiles are considerably troubled by the glare from the head lights of an on-coming automobile, hence it is the purpose of the present invention to provide a shield to assume a position in the path of the driver's vision, the shield comprising an area of green or amber color celluloid or other transparency mounted in a frame, thereby shielding the glare from the driver's eyes, therefore in this manner avoiding various accidents, such as sideswiping, on-coming collision, and driving off the side of the road.
Another purpose is to provide, in a device of this kind, an improved means for actuating the glare shield, said means having an electric circuit including a circuit closer, so that when the latter is operated, the circuit is closed and the shield operated either to an operative position in the path of the vision, or to an inoperative position out of the path of the vision of the driver.

One of the features of the invention comprises a casing housing a pair of solenoids having a core, so positioned in the solenoids that when one or the other is energized, the core is reciprocated in one direction or the other, the core carrying an arm having the shield thereon, said arm operating in an angularly disposed slot in order to cause the shield to move in an upward direction out of the path of the vision or downwardly into the path of the vision of the driver, said cam slot having at its upper end an off-set to retain the arm in a raised position.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figures 1, 2, 3:
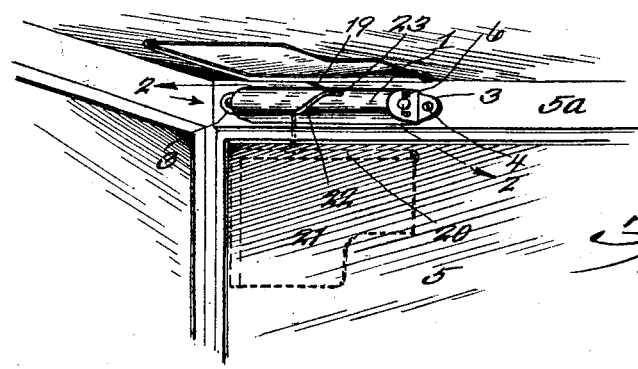
Figure 1 is a view in elevation of a portion of a windshield and the top of the automobile, showing an improved head light glare shield applied, showing the shield in a raised position in full lines and in a lowered position in dotted lines.
Figure 2 is a sectional view on line 2—2 of Figure 1, showing the shield lowered in the path of the vision of the driver.
Figure 3 is an enlarged view of the device detached from the windshield more clearly showing the construction and operation thereof.

Referring to the drawing 1 identifies a housing, which may be made of any suitable metal preferably aluminum and which may be any suitable size and shape, preferably of an elongated character and arched in cross section. The housing is provided with closed ends 2 having lateral flanges 3 receiving fastening means 4 for securing the housing in position at the top 5a of the automobile near the windshield 5.

Mounted in the housing and secured at 6 to the ends thereof are solenoids 7. The solenoids include a circuit comprising the wires or leads 8, together with a circuit closure 9. This circuit closure 9 consists of a holder 10 having contacts 11 and 12, and pivotally mounted at 13 in the holder is a switch element 14. This element is spring tensioned through the medium of a spring 15 which is fastened at 16 in the holder. The opposite ends of the spring bear against the under face of the switch element to hold it in neutral position. The switch element may be made of any suitable material preferably of insulation, such as hard rubber, or the like. The opposite ends of the spring constitute contacts, either one of which may engage with one or the other of the contacts 11 and 12, for the purpose of closing the circuits, which include the solenoids. The securing screws 16 act as a terminal for one of the wires or leads.

Mounted in the solenoids is a reciprocating plunger or core 18 which operates back and forth through the solenoid it depending on the one being energized.

An arm 19 is carried by the plunger or core and the end of the arm is fastened to a suitable frame 20 made of sheet aluminum and clamped in this frame in any convenient manner is a piece of celluloid or transparency 21, preferably of green or amber color. If of amber color it has been found preferable to have a double thickness of material, or a single thickness equal to a double thickness of a certain gauge, to permit the head lights to be visible therethrough but entirely eliminating the glare from the driver's eyes. The lower right hand corner of the transparency or shield is cut away, to permit the driver to have the usual vision of the roadway, when the shield is in a lowered position, that is the vision of the roadway substantially immediate in front of the automobile.

The arm 19 extends through an inclined slot 22 formed in the casing or hood, the slot being of such an angle as to cause the arm to ride upwardly of the slot and engage in an off-set 23 at the upper end of the slot, so that when the solenoid on the right hand side is energized, sucking the core or plunger thereinto, the plunger or core will rotate and the shield raised to an upward position, out of vision of the driver, the off-set 23 acting to retain the arm in such raised position. When the solenoid on the left is energized, by depressing the left hand end of the switch member of the circuit closure, the plunger or core will be moved or drawn to the left, moving the arm out of the off-set 23, and due to the inclination of the slot the shield will fall by gravity into position in the path of the vision of the driver. It is the gravity of the shield and the inclination of the slot that causes the shield to move in a lowered position, for the reason that the switch member is merely tilted long enough to close the circuit, to move the arm out of the off-set. However when energizing the solenoid to the right, it is the aim to hold the switch member 9 depressed and its circuit closed long enough to move the arm into engagement with the off-set.

The invention having been set forth, what is claimed is:

In a headlight glare shield, the combination with a cylindrical casing adapted for mounting immediately above and adjacent the windshield, of a pair of solenoids one supported in each end of the casing, a core mounted for reciprocating movement within the solenoids, said casing having a compound curved slot arranged on an angle in the wall of the casing at a point between the adjacent ends of the solenoids, an arm carried by the core extending radially therefrom and guided in said slot, whereby as the core is reciprocated back and forth between the solenoids a swinging movement is imparted to the arm, and a glare shield carried by the arm adapted to swing down in front of the windshield, when the arm swings downwardly, and adapted to assume a position adjacent the top of the automobile when the arm is swung upwardly, said solenoids including an electrical circuit, and means including a manually operated tensioned rocking element in the circuit for energizing first one and then the other of the solenoids for reciprocating the core.

In testimony whereof he affixes his signature.

JOSEPH C. PEARSON.